(12) United States Patent
Ozawa et al.

(10) Patent No.: US 7,793,915 B2
(45) Date of Patent: Sep. 14, 2010

(54) VALVE DRIVE DEVICE

(75) Inventors: Shigeru Ozawa, Komagane (JP);
Tetsuhiko Hara, Komagane (JP)

(73) Assignee: Nidec Sankyo Corporation, Nagano (JP)

( * ) Notice: Subject to any disclaimer, the term of this patent is extended or adjusted under 35 U.S.C. 154(b) by 1315 days.

(21) Appl. No.: 11/207,313

(22) Filed: Aug. 19, 2005

(65) Prior Publication Data

US 2006/0038150 A1    Feb. 23, 2006

(30) Foreign Application Priority Data

Aug. 20, 2004   (JP)   ............................. 2004-241362

(51) Int. Cl.
*F16K 31/44*    (2006.01)
(52) U.S. Cl. ........................ 251/248; 251/211; 251/286
(58) Field of Classification Search ................ 251/284, 251/286, 248, 250.5, 211; 137/625.46, 137, 137/625.47
See application file for complete search history.

(56) References Cited

U.S. PATENT DOCUMENTS

| | | | | |
|---|---|---|---|---|
| 1,912,295 A | * | 5/1933 | Mintz | ........................... 137/607 |
| 2,351,732 A | * | 6/1944 | Almond et al. | ......... 137/624.21 |
| 3,964,514 A | * | 6/1976 | Manoogian et al. | .... 137/625.17 |
| 4,093,180 A | * | 6/1978 | Strabala | ....................... 251/248 |
| 4,097,222 A | * | 6/1978 | Faudemay | ................... 431/344 |
| 4,387,880 A | * | 6/1983 | Saarisalo et al. | ............. 251/285 |
| 4,438,781 A | * | 3/1984 | Brenholt | ................ 137/625.28 |
| 4,440,382 A | * | 4/1984 | Pruvot et al. | ................. 251/248 |
| 4,962,912 A | * | 10/1990 | Stoll | .......................... 251/208 |
| 5,062,611 A | * | 11/1991 | Hatton | ................... 251/129.11 |
| 5,326,075 A | * | 7/1994 | Goff | ............................ 251/285 |
| 5,372,351 A | * | 12/1994 | Oliver | ......................... 251/65 |
| 5,385,167 A | * | 1/1995 | Owen et al. | ............ 137/315.17 |
| 5,398,717 A | * | 3/1995 | Goncze | ....................... 137/270 |
| 5,417,083 A | * | 5/1995 | Eber | ............................ 62/528 |
| 5,476,246 A | * | 12/1995 | Wendel et al. | .......... 251/129.11 |
| 5,842,680 A | * | 12/1998 | Bustamante et al. | ........... 251/65 |
| 5,992,459 A | * | 11/1999 | Sugita et al. | ............ 137/625.43 |
| 6,058,726 A | * | 5/2000 | Noritake | ....................... 62/186 |
| 6,231,028 B1 | * | 5/2001 | Hirata et al. | ............ 251/129.11 |
| 6,682,045 B2 | * | 1/2004 | Hashimoto | ............. 251/129.11 |
| 6,877,716 B2 | * | 4/2005 | Noritake | ................ 251/129.12 |
| 6,962,320 B2 | * | 11/2005 | Ozawa | .................... 251/129.11 |
| 7,028,979 B2 | * | 4/2006 | Fauni | ..................... 251/129.12 |
| 7,284,571 B2 | * | 10/2007 | Ozawa et al. | ........... 137/625.46 |

FOREIGN PATENT DOCUMENTS

EP         1406036 A1 *    4/2004
JP         2003-21254       1/2003

\* cited by examiner

*Primary Examiner*—Stephen M Hepperle
*Assistant Examiner*—Cloud K Lee
(74) *Attorney, Agent, or Firm*—Frommer Lawrence & Haug LLP

(57) ABSTRACT

A valve drive device includes a valve element for opening or closing the inflow port or the outflow port, a drive mechanism for driving the valve element, an abutting part which is provided in any operation member included between the drive mechanism and the valve element, and a restriction part for restricting rotation of the valve element by abutting with the abutting part. The valve element is rotated by the drive mechanism so that the inflow port or the outflow port is opened or closed, and one of the abutting part and the restriction part is formed of an elastic member.

8 Claims, 6 Drawing Sheets

(A)

(B)

(A)

(B)

VALVE DRIVE DEVICE

CROSS-REFERENCE TO RELATED APPLICATIONS

This application claims priority to Japanese Application No. 2004-241362 filed Aug. 20, 2004, which is incorporated herein by reference.

FIELD OF THE INVENTION

The present invention relates to a valve drive device for opening and closing a plurality of aperture parts by using a valve element to distribute fluid.

BACKGROUND OF THE INVENTION

A refrigerator is provided with a valve drive device which distributes common refrigerant (fluid) to a plurality of compartments for cooling the respective compartments. The valve drive device includes a valve seat plate 13' through which an inflow port 13c for the refrigerant and outflow ports 13a', 13b' for the refrigerant pass in its thickness direction, a sealing case 19 which covers on the front face side of the valve seat plate 13', and a valve element 30' which is integrated with a gear 36' and slides on the surface of the valve seat plate 13' to open or close the outflow ports 13a', 13b' as shown in FIGS. 6(A) and 6(B). Further, a rotor 15' and the valve element 30' are respectively rotatably supported by a rotor support shaft 18 and a valve element support shaft 35' which are fixed in the valve seat plate 13' (see, for example, Japanese Patent Laid-Open No. 2003-21254).

The gear 36' engages with a pinion 15e of the rotor 15' and is rotated around the valve element support shaft 35' with the rotation of the rotor 15'. Therefore, the opening/closing of the outflow ports 13a', 13b' can be controlled by changing angular position of the valve element 30' (area as shown by the oblique lines in FIG. 6(B)).

In the valve drive device constructed as described above, the opening/closing of the outflow ports 13a', 13b' is required to be accurately performed and thus it is necessary to accurately grasp the position of the valve element 30'. Therefore, conventionally, protruding parts 32 are formed in the gear 36' which is integrally formed with the valve element 30' as shown in FIG. 6(B). The protruding part 32 abuts with a vicinity portion of the pinion 15e of the rotor 15' and this position where the rotation is restricted is detected as a home position and the reset of position of the valve element 30' is performed. FIG. 6(B) shows the state that the protruding part 32 of the left side gear 36' abuts with the vicinity portion of the pinion 15e.

However, recently, refrigerators have been required to be silent and thus its collision noise becomes a problem which is generated at the moment when the protruding part 32 abuts with the vicinity portion of the pinion 15e at the home position. Further, in order to perform the return to the home position of the protruding part 32, it is necessary to continue energization for a while after the protruding part 32 has abutted with the vicinity portion of the pinion 15e. Especially, when a stepping motor is used as a driving source, collision noise which is generated by the protruding part 32 intermittently colliding with the vicinity portion of the pinion 15e has continued during the locked state after the protruding part 32 has abutted with the vicinity portion of the pinion 15e.

SUMMARY OF THE INVENTION

In view of the problems described above, it is an object and advantage of the present invention to provide a valve drive device in which the protruding part is capable of being returned to the home position without hardly generating collision noise and the position of the valve element can be surely grasped.

In order to achieve the above object and advantage, according to an embodiment of the present invention, there is provided a valve drive device including an inflow port and an outflow port for fluid, a valve element for opening or closing the inflow port or the outflow port, a drive mechanism for driving the valve element. The valve element is rotated by the drive mechanism to open or close the inflow port or the outflow port. The valve drive device also includes an abutting part which is provided in any operation member included between the drive mechanism and the valve element, and a restriction part for restricting the rotation of the valve element by abutting with the abutting part. The restriction part is provided in another operation member included between the drive mechanism and the valve element. One of the abutting part and the restriction part is formed of an elastic member.

In accordance with an embodiment of the present invention, the operation members are included in a gear train and the abutting part and the restriction part are respectively provided in a tooth part of a gear member or in a vicinity of a gear member of the gear train which engage with each other. According to the construction described above, since the abutting part and the restriction part can be provided by utilizing gears as the operation members, the dedicated members for forming the abutting part and the restriction part are not required.

In accordance with an embodiment of the present invention, a recessed part is preferably formed in a vicinity of the tooth part of the gear member and the elastic member is formed in a ring shape and is disposed in the recessed part. According to the construction described above, since only the abutting part or the restriction part may be formed from the elastic member, the tooth part where a high degree of hardness is required is not required to be formed from an elastic member. Moreover, since the elastic member is formed in a ring shape, the elastic member can be extremely easily fitted to the recessed part.

In accordance with an embodiment of the present invention, the gear train includes a pinion member which is rotated by the drive mechanism and a gear member which is provided with the valve element and rotationally driven by the pinion member. The recessed part is formed on the outer peripheral face of the pinion member and the elastic member is disposed in the recessed part as the restriction part and a protruding part abutting with the elastic member is provided in the gear member as the abutting part. In this case, the width of the recessed part is preferably set to be larger than the width of the elastic member which is formed in a ring shape such that the elastic member is not squeezed by the recessed part.

In accordance with an embodiment of the present invention, the elastic member preferably has rubber elasticity.

As described above, in an embodiment of the present invention, the valve drive device includes an abutting part which is provided in any operation member included between the drive mechanism and the valve element, and a restriction part for restricting rotation of the valve element by abutting with the abutting part. The restriction part is provided in another operation member included between the drive mechanism and the valve element. One of the abutting part and the restriction part is formed of an elastic member. Therefore, even when the abutting part and the restriction part collide forcibly, the impact is absorbed and thus the collision noise is hardly generated. In addition, the strength of the abutting part can be lowered to the extent corresponding to the impact lowered by the elastic member and thus the downsizing of the device can be attained. Further, in the case that a stepping motor is used as a drive mechanism, even when the energization to the stepping motor is continued after the abutting part has abutted with the restriction part in order to surely make the abutting part return to the home position, the occurrence of the collision noise generated by the abutting part intermittently colliding with the restriction part can be reduced.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

A valve drive device for a refrigerator in accordance with an embodiment of the present invention will be described below with reference to the accompanying drawings.

Figure 1:
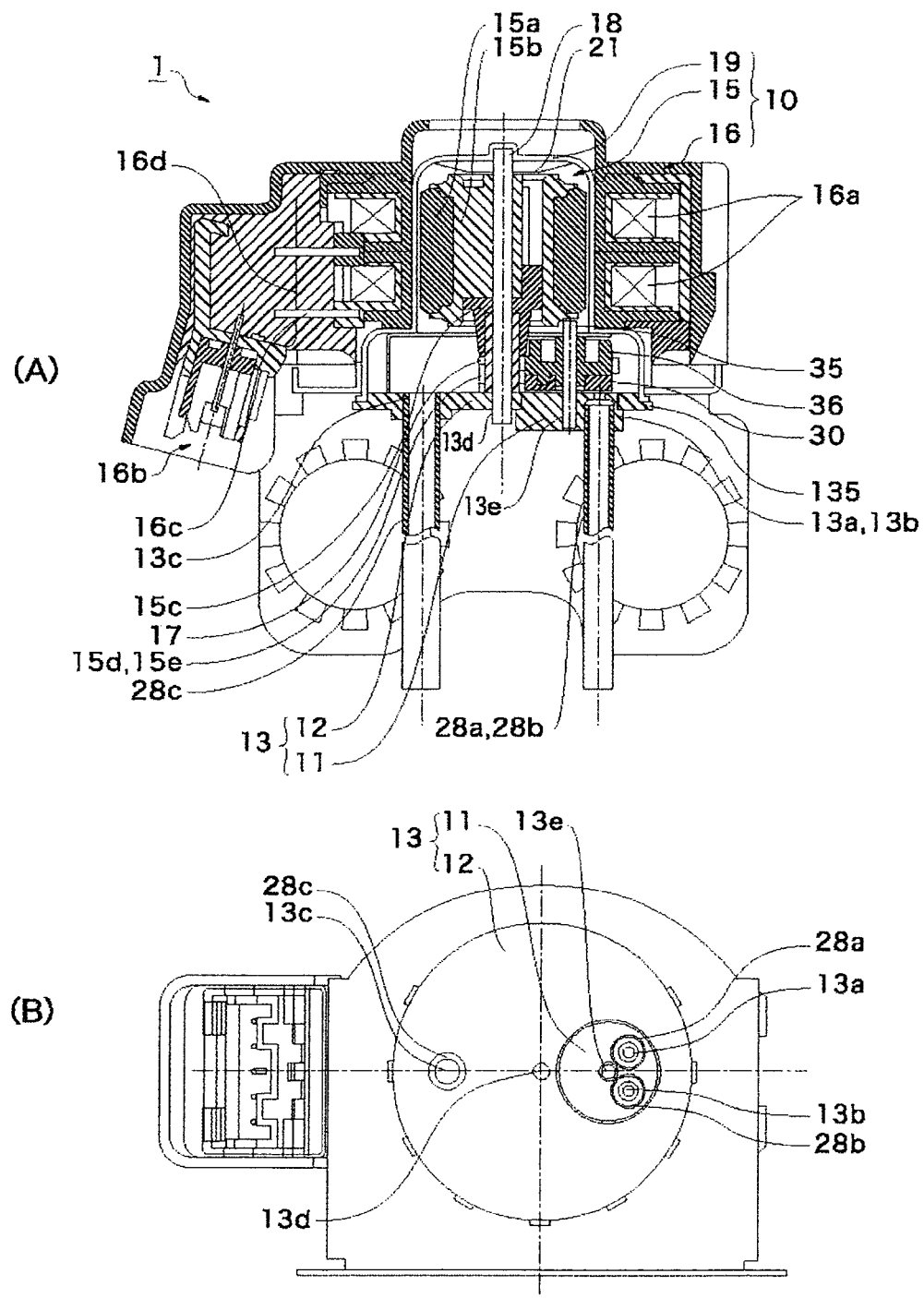
FIG. 1(A) is a longitudinal cross-sectional view showing a valve drive device in accordance with an embodiment of the present invention and FIG. 1(B) is its bottom view.
Figure 2:
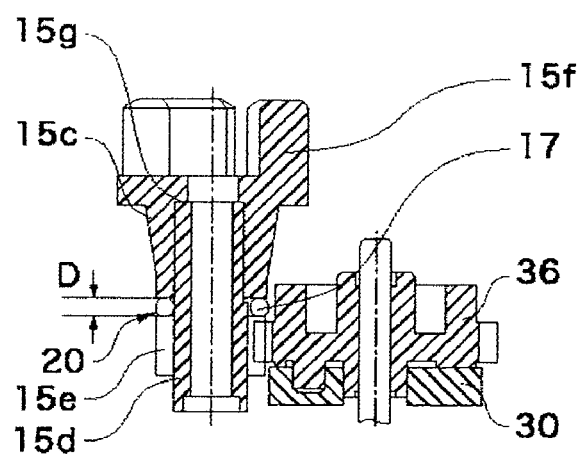
FIG. 2(A) is an enlarged longitudinal cross-sectional view showing an essential portion of the valve drive device shown in FIG. 1
FIG. 2(B) is an enlarged perspective view showing the peripheral portion of a valve element which is obliquely viewed from above.
Figure 2:
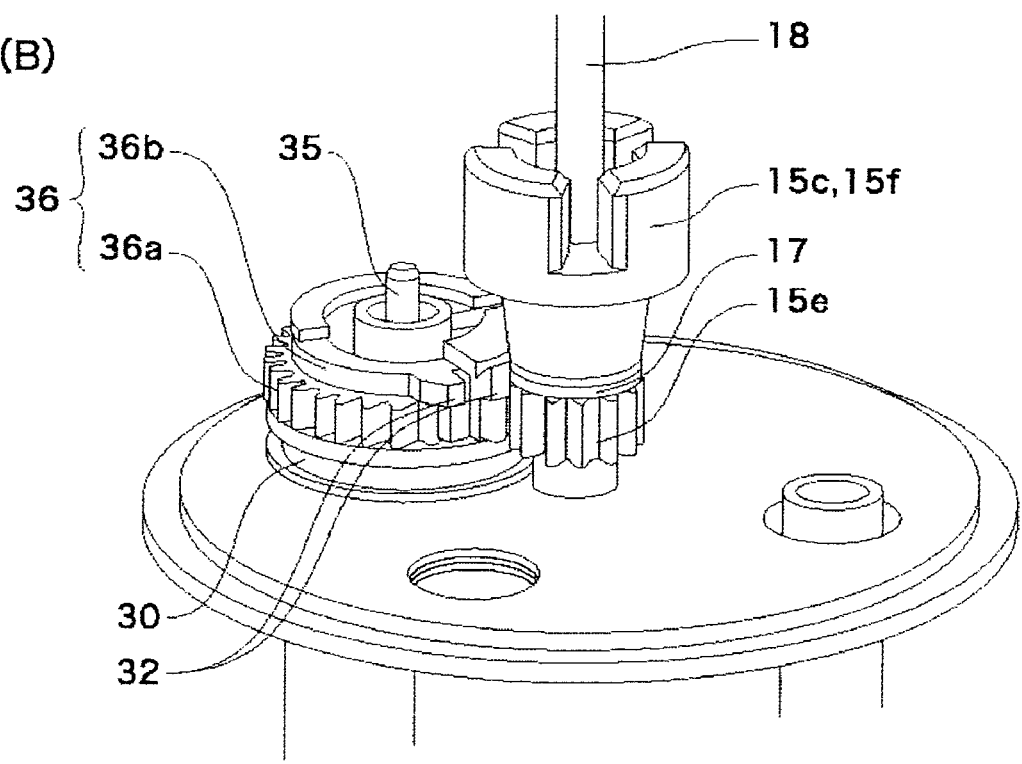
Figure 3:
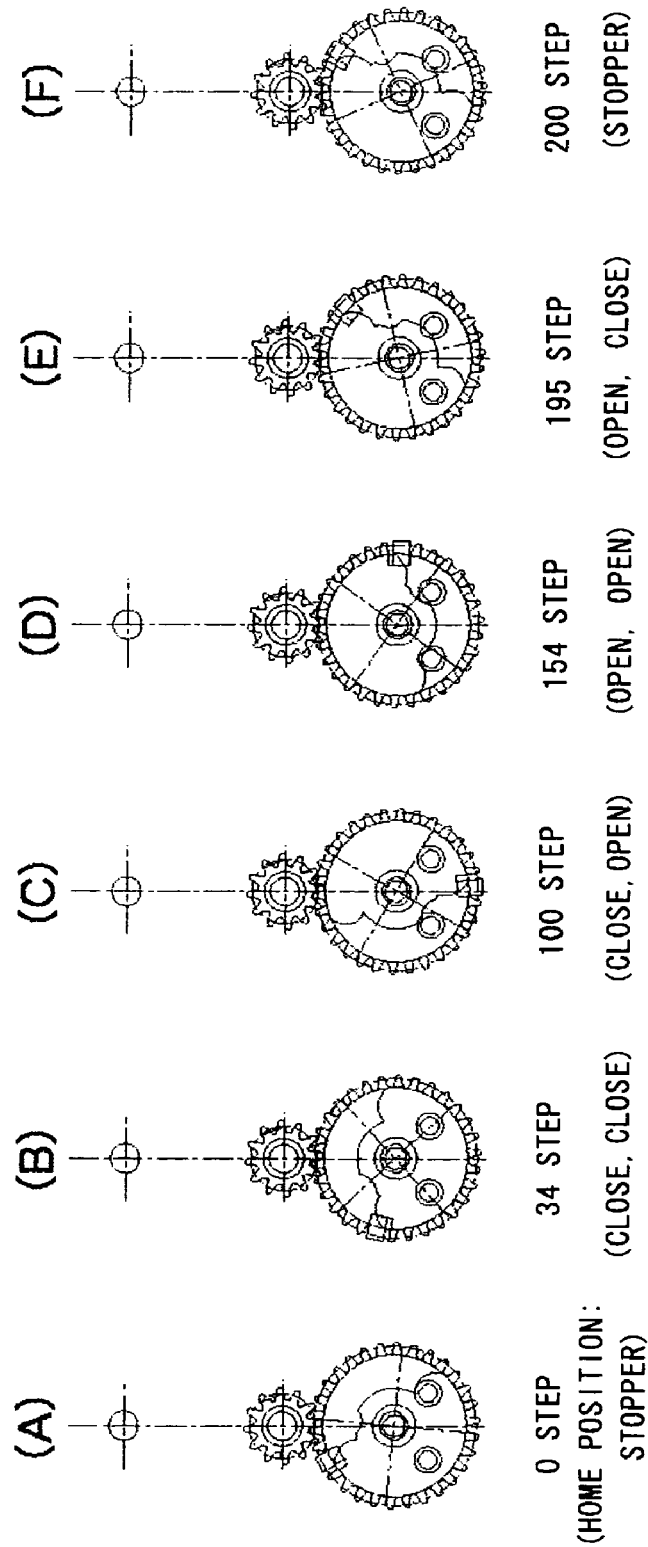
FIGS. 3(A) through 3(F) are respectively explanatory views showing respective modes in the valve drive device shown in FIG. 1.
Figure 4:
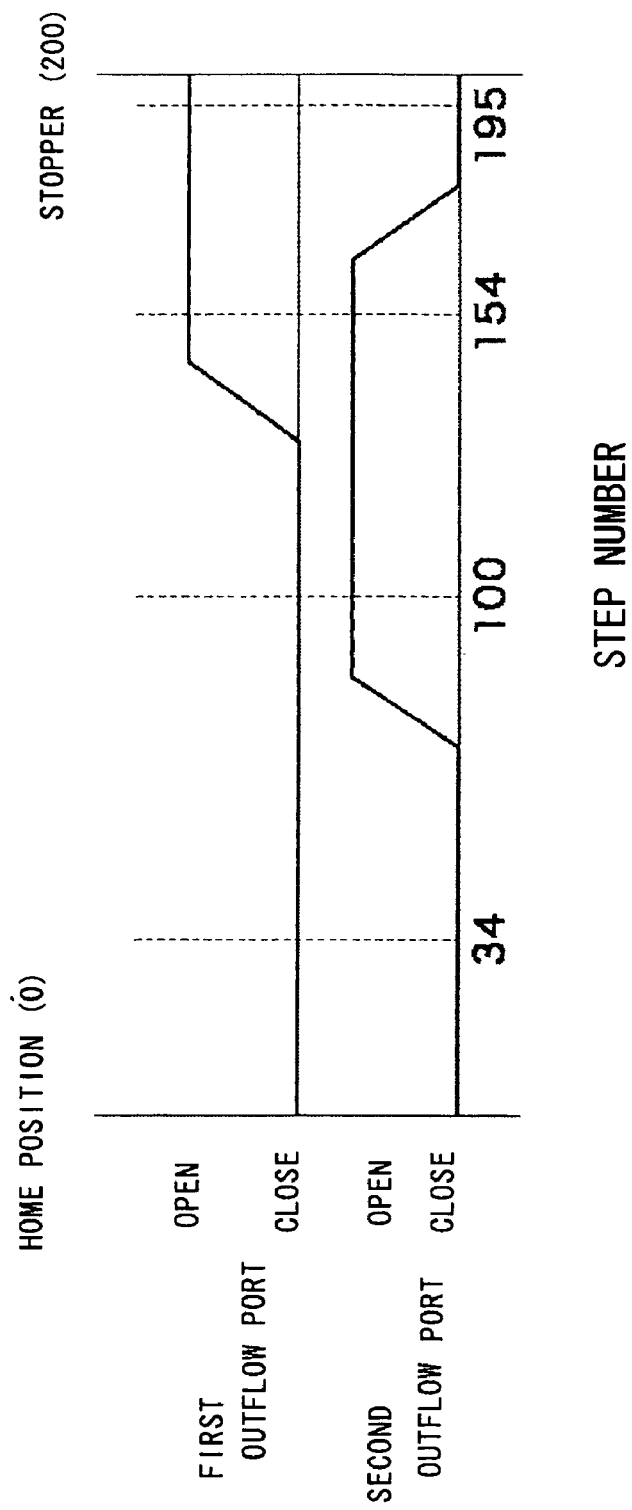
FIG. 4 is an open/close chart of a first inflow port and a second inflow port in the valve drive device in accordance with an embodiment of the present invention.

FIG. 1(A) is a longitudinal cross-sectional view showing a valve drive device in accordance with an embodiment of the present invention and FIG. 1(B) is its bottom view. FIG. 2(A) is an enlarged longitudinal cross-sectional view showing the essential portion of the valve drive device shown in FIG. 1 and FIG. 2(B) is an enlarged perspective view showing the peripheral portion of a valve element which is obliquely viewed from above. FIGS. 3(A) through 3(F) are respectively explanatory views showing respective modes in the valve drive device shown in FIG. 1. FIG. 4 is an open/close chart of the valve element in accordance with an embodiment of the present invention.

In FIGS. 1(A) and 1(B), the valve drive device 1 in accordance with an embodiment of the present invention is provided with a valve seat plate 13 and a sealing case 19 which is put on the front face side of the valve seat plate 13.

In the valve drive device 1, a stepping motor 10 as a valve driving device for driving the valve element 30 is assembled by utilizing the inside and the outside of the sealing case 19. In the stepping motor 10, a rotor 15 is disposed on the inner side of the sealing case 19 and a stator 16 is disposed on the outer periphery of the sealing case 19. Wire terminals drawn out from fixed coils 16a of the stator 16 are respectively wound around terminal pins 16c and the terminal pins 16c and a connector 16b are connected to each other by a FPC 16d. Drive signals are outputted to the connector 16b from a control section (not shown in the drawing) having a microcomputer to control the rotation and stoppage of the rotor 15.

The lower side of the sealing case 19 is formed to be an enlarged portion having a larger diameter to construct a step portion on which the stator 16 is mounted. The lower end portion of the sealing case 19 is tightly fitted with a step portion 13s that is formed in the outer peripheral edge part of the valve seat plate 13.

As shown in FIGS. 1(A) and 1(B), an inflow port 13c and two outflow ports 13a, 13b are formed to be opened in the valve seat plate 13. The inflow port 13c is in communication with an inflow pipe 28c that is inserted into the valve seat plate 13 and the two outflow ports 13a, 13b are respectively in communication with outflow pipes 28a, 28b which are inserted into the valve seat plate 13. Therefore, the refrigerant which is introduced into the sealing case 19 through the inflow port 13c flows out from the outflow ports 13a, 13b.

Shaft holes 13d, 13e are formed as a straight hole near the outflow ports 13a, 13b in the valve seat plate 13. The base end portion of a rotor support shaft 18 and the base end portion of a valve element support shaft 35 are respectively fixed to the shaft holes 13d, 13e by brazing.

In an embodiment of the present invention, the valve seat plate 13 is constructed of a first disk-shaped plate member 11 in which the outflow ports 13a, 13b are formed and a second disk-shaped plate member 12 on which the first plate member 11 is mounted. The first plate member 11 is formed in a size having an entire area where the valve element 30 slides when the outflow ports 13a, 13b are opened or closed.

In FIGS. 1(A) and 1(B) and FIGS. 2(A) and 2(B), a gear 36 which is integrally constructed with the valve element 30 is rotatably supported to the valve element support shaft 35. In an embodiment of the present invention, the valve element 30 is used as a common valve element which slides on the surface of the valve seat plate 13 over the area where the outflow ports 13a, 13b are formed to respectively open or close the outflow ports 13a, 13b. The gear 36 is formed with a cylindrical edge part 36b having a smaller diameter than that of a tooth part 36a on an opposite side of the tooth part 36a with respect to the valve element 30 as shown in FIG. 2(B). Two protruding parts 32, which protrude outward in a radial direction, are adjacently formed to each other in a circumferential direction and are formed on the outer periphery of the cylindrical edge part 36b.

The gear 36 engages with a pinion 15e and is rotatably driven about the valve element support shaft 35 by the stepping motor 10. Therefore, the valve element 30 is also rotatably driven by the stepping motor 10.

In an embodiment of the present invention, a state where the first outflow port 13a is closed and the second outflow port 13b is closed is set to a CLOSE-CLOSE mode, a state where the first outflow port 13a is closed and the second outflow port 13b is opened is set to a CLOSE-OPEN mode, a state where both the first outflow port 13a and the second outflow port 13b are opened is set to an OPEN-OPEN mode, and a state where the first outflow port 13a is opened and the second outflow port 13b is closed is set to an OPEN-CLOSE mode. Therefore, when the angular position of the valve element 30 is controlled, the home position of CLOSE-CLOSE state shown in FIG. 3(A) (zero step in FIG. 4), the CLOSE-CLOSE mode shown in FIG. 3(B) (34 steps in FIG. 4), the CLOSE-OPEN mode shown in FIG. 3(C) (100 steps in FIG. 4), the OPEN-OPEN mode shown in FIG. 3(D) (154 steps in FIG. 4), the OPEN-CLOSE mode shown in FIG. 3(E) (195 steps in FIG. 4), and the end position of OPEN-CLOSE state shown in FIG. 3(F) (200 steps in FIG. 4) can be obtained in this order.

The rotor 15 in the valve drive device 1 in accordance with an embodiment of the present invention includes, as shown in FIGS. 1(A) and 1(B) and FIGS. 2(A) and 2(B), a magnet holding member 15b on which a magnet 15a is held on its outer peripheral side and which is rotatably supported by the rotor support shaft 18, a pinion member 15d which is rotatably supported by the rotor support shaft 18, and a connecting member 15c which connects the magnet holding member 15b and the pinion member 15d in an integrally rotatable manner.

The pinion member 15d is formed in a tubular shape so that the rotor support shaft 18 can be loosely fitted to its inner peripheral face and a pinion 15e is formed on its outer peripheral face on the lower side in the drawing. A so-called D-cut portion where a part of its outer periphery is cut in the axial direction is formed on the upper side of the pinion 15e.

The connecting member 15c is also formed in a tubular shape and its inner peripheral portion is engaged with the outer peripheral portion where the D-cut portion of the pinion member 15d is formed so that they are rotatable in an integral manner. In other words, since the outer peripheral face that is cut to be the D-cut portion of the pinion member 15d is formed in a flat face, a flat face is formed on the inner peripheral face of the connecting member 15c to abut with this flat face of the pinion member 15d. The pinion member 15d and the connecting member 15c are formed so as to be rotatable in an integral manner by both the flat faces engaged with each other. In addition, the upper side in the drawing of the connecting member 15c is formed such that its diameter is increased and slits which reach to the upper end are formed at three positions in the axial direction. Therefore, three engagement parts 15f are formed in the axial direction along the circumferential direction.

Engaging grooves which are capable of engaging with the three engagement parts 15f are formed in the magnet holding member 15b. Three engagement parts 15f are engaged with the engaging grooves and thus the magnet holding member 15b and the connecting member 15c are rotatable in an integral manner.

A spring member 21 is disposed between the upper end portion of the magnet holding member 15b and the sealing case 19 to urge the rotor 15 downward. Therefore, the lower end portion of the pinion member 15d abuts with the valve seat plate 13 in a pressing state and the magnet holding part 15b is rotated by the rotating magnetic field which is generated with energization to the stator 16. As a result, the connecting member 15c and the pinion member 15d are integrally rotated.

As shown in FIG. 2(A), when the pinion member 15d is inserted into the connecting member 15c such that the D-cut face of the pinion member 15d abuts with the flat face of the inner wall of the connecting member 15c, the upper end of the pinion member 15d is positioned at the position where the upper end of the pinion member 15d abuts with the stepped part 15g of the connecting member 15c. In this case, a gap space 20 is formed between the upper end of the pinion 15e and the lower end of the connecting member 15c and a rubber ring 17 made of NBR as a restriction part is fitted to the gap space 20. The rubber ring 17 is not necessarily limited to NBR and other synthetic rubbers such as SBR, BR and IR or natural rubber may be used.

In order to accurately perform the opening/closing of the outflow ports 13a, 13b, the position of the valve element 30 is required to be grasped. In an embodiment of the present invention, the home position is set to be the position where two protruding parts 32 as an abutting part which are formed on the gear 36 abut with the rubber ring 17, which is an elastic member, and further rotation is restricted. In this embodiment of the present invention, the following two positions are the home positions, in other words, the position of the home position of CLOSE-CLOSE state shown in FIG. 3(A) (zero step in FIG. 4) and the position of the end position of OPEN-CLOSE state shown in FIG. 3(F) (200 steps in FIG. 4).

The width "D" of the gap space 20 in the axial direction is formed slightly larger than the diameter of the rubber ring 17. Therefore, the rubber ring 17 is not squeezed and deformed. Therefore, since the rubber ring 17 is not squeezed and its diameter is not changed, the positional accuracy of the home position of the valve element 30 can be improved and the opening/closing of the outflow ports 13a, 13b by the valve element 30 can be accurately performed. In this embodiment of the present invention, the rotor 15 of the stepping motor, the gear 36 and the valve element 30 are the operation members.

As described above, in this embodiment of the present invention, the rubber ring 17 for abutting with the protruding part 32 of the gear 36 is provided to restrict the rotation of the valve element 30. The rubber ring 17 has rubber elasticity and the impact is absorbed even when the protruding part 32 is forcibly collided with the rubber ring 17 and thus the collision noise is hardly generated. Further, since the strength of the protruding part 32 can be reduced enough to endure the collision which is absorbed by the rubber ring 17, the downsizing of the gear 36, in other words, the downsizing of the valve drive device can be attained. Further, in order to surely make the protruding part 32 return to the home position, even when the energization to the stepping motor 10 is continued for a while after the protruding part 32 has abutted with the rubber ring 17, the occurrence of the collision noise can be reduced which is generated by the protruding part 32 that intermittently collides with the rubber ring 17.

In this embodiment of the present invention, the protruding part 32 and the rubber ring 17 are respectively provided in the pinion member 15e and the gear 36. Thus, dedicated members are not required to form the protruding part 32 and the rubber ring 17.

In addition, in this embodiment of the present invention, the gap space 20 is formed in the vicinity of the pinion 15e and the rubber ring 17 is disposed in the gap space 20. Therefore, the tooth part where a high degree of hardness is required is not necessary to be formed with an elastic member. Moreover, since the rubber ring 17 is formed in a ring shape, the rubber ring 17 can be extremely easily fitted to the gap space 20.

Figure 5:
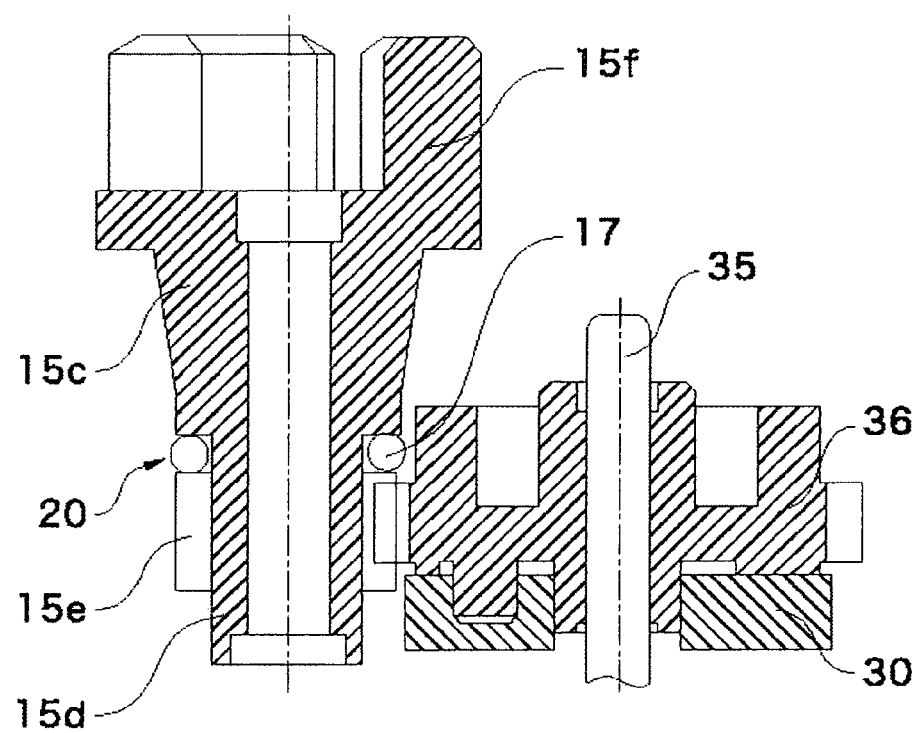
FIG. 5 is an enlarged longitudinal cross-sectional view showing the essential portion of a valve drive device in accordance with another embodiment of the present invention.
Figure 6:
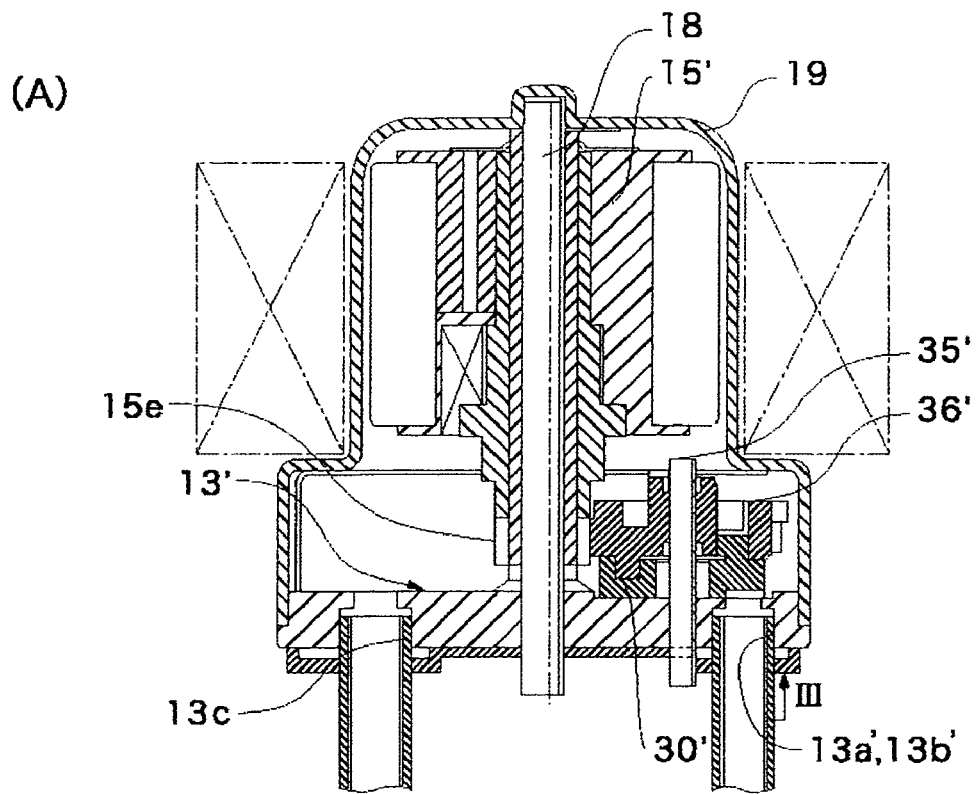
FIG. 6(A) is a longitudinal cross-sectional view showing a conventional valve drive device which is cut by the line of X-X' in FIG. 6(B) and FIG. 6(B) is an explanatory view showing a state where the protruding part of a left side gear collides with a vicinity of the pinion.
Figure 6:
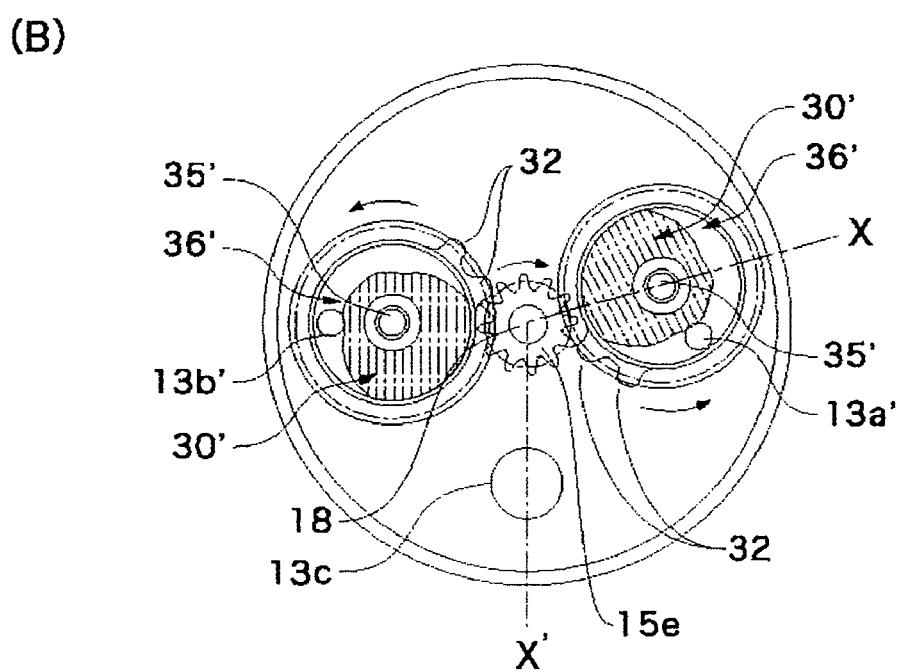

The rotor 15 in the embodiment described above is composed of the pinion member 15d and the connecting member 15c. However, the present invention is not limited to the above-mentioned structure. In other words, as shown in FIG. 5, the pinion member 15d and the connecting member 15c may be formed into an integral member. In this case, when the integral member provided with the pinion member 15d and the connecting member 15c is formed by integral moulding, the integral member is required to be formed in a complicated shape having the engaging grooves 20, the engagement parts 15f and the like. Therefore, the integral member cannot be formed by dies which are opened only in the axial direction and thus the dies which are opened on the right and left sides are used. Alternatively, when the dies which are opened only in the axial direction are used, the integral member is formed without the engaging grooves 20 and, after that, the engaging grooves 20 may be formed by cutting or the like in a separate process.

Further, in an embodiment of the present invention, the rubber ring 17 is used as the restriction part. However, the rubber ring 17 is not necessarily used and, for example, the connecting member 15c itself may be made of synthetic rubber having rubber elasticity or of natural rubber.

In addition, in an embodiment of the present invention, the rubber ring 17 is used as the restriction part. However, the restriction part is not necessarily constructed of an elastic member, and the abutting part may be constructed of an elastic member. Further, both the abutting part and the restriction part may be constructed of an elastic member.

In addition, the restriction part is formed in one part of the rotor 15, but it is not necessarily formed in the rotor 15. The restriction part may be provided in any member which is disposed in a sealed space constructed by the valve seat plate 13 and the sealing case 19 covered on the front face side of the valve seat plate 13. The restriction part may be provided in the valve seat plate 13 itself or the sealing case 19 itself.

Further, in an embodiment of the present invention, the abutting part is formed in the gear 36. However, the abutting part is not necessarily formed in the gear 36 and may be formed in any operation member such as various members constructing the rotor 15 and the valve element 30.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A valve drive device comprising:
    an inflow port for fluid;
    an outflow port for fluid;
    a valve element for opening or closing the inflow port or the outflow port;
    a drive mechanism for driving the valve element;
    an abutting part which is provided in any operation member included between the drive mechanism and the valve element;
    a restriction part for restricting rotation of the valve element by abutting with the abutting part, which is provided in another operation member included between the drive mechanism and the valve element;
    a gear train which includes the operation members; and
    a recessed part which is formed in a vicinity of a tooth part of a gear member;
    wherein the valve element is rotated by the drive mechanism so that the inflow port or the outflow port is opened or closed, and one of the abutting part and the restriction part is formed of an elastic member,
    wherein the abutting part and the restriction part are respectively provided in a tooth part of a gear member or in a vicinity of a gear member of the gear train so as to be capable of engaging with each other, and
    wherein the elastic member is formed in a ring shape and is disposed in the recessed part.

2. The valve drive device according to claim 1,
    wherein the gear train includes a pinion member which is rotated by the drive mechanism and a gear member which is provided with the valve element and is rotationally driven by the pinion member, and the recessed part is formed on an outer peripheral face of the pinion member, and the elastic member is disposed in the recessed part as the restriction part and a protruding part abutting with the elastic member is provided in the gear member as the abutting part.

3. The valve drive device according to claim 2,
    wherein a width of the recessed part is set to be larger than a width of the elastic member which is formed in a ring shape such that the elastic member is not squeezed by the recessed part.

4. The valve drive device according to claim 1,
    wherein the elastic member is provided with rubber elasticity.

5. A valve drive device comprising:
    an inflow port for fluid;
    an outflow port for fluid;
    a valve operable to open and close the inflow port and the outflow port; and
    a drive mechanism operable to rotate the valve to open and close the inflow port and the outflow port, the drive mechanism including:
        an abutting part;
        a restriction part operable to restrict rotation of the valve by abutting with the abutting part,
    wherein at least one of the abutting part and the restriction part is at least partially formed of an elastic member so as to reduce noise caused by the abutting part abutting with the restriction part,
    wherein the abutting part and the restriction part are respectively provided in a tooth part of a gear member or in a vicinity of a gear member of the gear train so as to be capable of engaging with each other, and
    wherein a recessed part which is formed in a vicinity of the tooth part of the gear member, wherein the elastic member is formed in a ring shape and is disposed in the recessed part.

6. The valve drive device of claim 5,
    wherein both the first and second protruding parts are at least partially formed from elastic material.

7. The valve drive device according to claim 5,
    wherein the gear train includes a pinion member which is rotated by the drive mechanism and a gear member which is provided with the valve element and is rotationally driven by the pinion member, and the recessed part is formed on an outer peripheral face of the pinion member, and the elastic member is disposed in the recessed part as the restriction part and a protruding part abutting with the elastic member is provided in the gear member as the abutting part.

8. The valve drive device according to claim 7,
    wherein a width of the recessed part is set to be larger than a width of the elastic member which is formed in a ring shape such that the elastic member is not squeezed by the recessed part.

* * * * *